US010929392B1

(12) United States Patent
Cheng

(10) Patent No.: US 10,929,392 B1
(45) Date of Patent: Feb. 23, 2021

(54) ARTIFICIAL INTELLIGENCE SYSTEM FOR AUTOMATED GENERATION OF REALISTIC QUESTION AND ANSWER PAIRS

(71) Applicant: Amazon Technologies, Inc., Seattle, WA (US)

(72) Inventor: Weiwei Cheng, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 16/193,951

(22) Filed: Nov. 16, 2018

(51) Int. Cl.
*G06F 16/2452* (2019.01)
*G06N 3/08* (2006.01)

(52) U.S. Cl.
CPC ......... *G06F 16/24522* (2019.01); *G06N 3/08* (2013.01)

(58) Field of Classification Search
CPC ............................ G06F 16/24522; G06N 3/08
USPC .......................................................... 707/769
See application file for complete search history.

(56) References Cited

U.S. PATENT DOCUMENTS

| | | | | |
|---|---|---|---|---|
| 5,895,466 A * | 4/1999 | Goldberg | ............ | G06F 16/3329 |
| 8,621,209 B1 * | 12/2013 | Johansson | ............... | H04L 63/08 |
| | | | | 713/166 |
| 9,298,766 B2 * | 3/2016 | Kozloski | ............ | G06F 16/3331 |
| 9,330,084 B1 * | 5/2016 | Kadambi | ................. | G06F 40/56 |
| 10,009,375 B1 * | 6/2018 | Sites | ....................... | G06N 3/082 |
| 2011/0004508 A1 * | 1/2011 | Huang | ................... | G06Q 30/00 |
| | | | | 705/7.32 |
| 2014/0244317 A1 * | 8/2014 | Roberts | .................. | G06Q 40/08 |
| | | | | 705/4 |
| 2015/0178623 A1 * | 6/2015 | Balani | .................... | G06N 5/025 |
| | | | | 706/48 |
| 2015/0193429 A1 * | 7/2015 | Bohra | ................. | G06F 16/3329 |
| | | | | 704/9 |
| 2016/0019803 A1 * | 1/2016 | Ipeirotis | .................. | G09B 7/00 |
| | | | | 434/353 |

(Continued)

FOREIGN PATENT DOCUMENTS

WO     WO-2018195875 A1 * 11/2018   ............. G06F 40/30

OTHER PUBLICATIONS

Kumar et al., "Automating Reading Comprehension by Generating Question and Answer Pairs", D. Phung et al. (Eds): PAKDD 2018, LNAI 10939, pp. 335-348. (Year: 2018).*

*Primary Examiner* — Phuong Thao Cao
(74) *Attorney, Agent, or Firm* — Knobbe, Martens, Olson & Bear, LLP

(57) ABSTRACT

Generally described, one or more aspects of the present application correspond to machine learning techniques for generating realistic question-answer (QA) pairs for populating an initial community ask feature of electronic store item detail pages. The machine learning model can use a shared encoder to generate an embedding of a seed sentence from existing description of an item, and then pass that embedding to a question decoder to generate a question. The embedding of the seed sentence can be combined with a state representation of the question and provided to an answer decoder, which can generate an answer to the generated question. This can help overcome the cold start problem, where customers are less likely to ask questions about items that have no existing QA set. This can also help surface relevant information about items in a concise QA format that is easy for customers to find and read.

20 Claims, 9 Drawing Sheets

(56) References Cited

U.S. PATENT DOCUMENTS

| | | | | |
|---|---|---|---|---|
| 2016/0180242 A1* | 6/2016 | Byron | ............... | G06N 5/041 |
| | | | | 706/11 |
| 2017/0032689 A1* | 2/2017 | Beason | ............... | G06F 40/30 |
| 2017/0124432 A1* | 5/2017 | Chen | ............... | G06F 40/30 |
| 2017/0213139 A1* | 7/2017 | Sawant | ............... | G06N 3/006 |
| 2017/0358295 A1* | 12/2017 | Roux | ............... | G06F 40/40 |
| 2018/0114108 A1* | 4/2018 | Lao | ............... | G06N 3/0445 |
| 2018/0121785 A1* | 5/2018 | Min | ............... | G06N 5/04 |
| 2018/0143966 A1* | 5/2018 | Lu | ............... | G06K 9/4628 |
| 2018/0150743 A1* | 5/2018 | Ma | ............... | G06N 3/084 |
| 2018/0300314 A1* | 10/2018 | Xie | ............... | G06N 3/08 |
| 2018/0329884 A1* | 11/2018 | Xiong | ............... | G06N 3/0445 |
| 2018/0342174 A1* | 11/2018 | Zhang | ............... | G06F 40/216 |
| 2018/0365220 A1* | 12/2018 | Chakraborty | ............... | G06N 3/0454 |
| 2019/0043379 A1* | 2/2019 | Yuan | ............... | G06N 3/02 |
| 2019/0065600 A1* | 2/2019 | Katz | ............... | G06F 16/345 |
| 2019/0079915 A1* | 3/2019 | Min | ............... | G06F 40/20 |
| 2019/0130248 A1* | 5/2019 | Zhong | ............... | G06F 16/2462 |
| 2019/0173918 A1* | 6/2019 | Sites | ............... | H04L 63/1433 |
| 2019/0228099 A1* | 7/2019 | Bajaj | ............... | G06F 16/38 |
| 2019/0258939 A1* | 8/2019 | Min | ............... | G06N 3/0445 |
| 2019/0325068 A1* | 10/2019 | Lai | ............... | G06N 3/08 |
| 2019/0325523 A1* | 10/2019 | Demetry | ............... | G06F 16/2379 |
| 2019/0355270 A1* | 11/2019 | McCann | ............... | G06F 40/35 |
| 2020/0004831 A1* | 1/2020 | Burceanu | ............... | G06F 40/211 |
| 2020/0042597 A1* | 2/2020 | Wu | ............... | G06F 16/3329 |
| 2020/0044990 A1* | 2/2020 | Zhao | ............... | G06N 7/00 |
| 2020/0065389 A1* | 2/2020 | Lu | ............... | G06N 3/0454 |

* cited by examiner

US 10,929,392 B1

ARTIFICIAL INTELLIGENCE SYSTEM FOR AUTOMATED GENERATION OF REALISTIC QUESTION AND ANSWER PAIRS

BACKGROUND

An electronic store can host listings for various items in the store, where such items include goods available for acquisition (e.g., purchase or rental) by users of the electronic store. The electronic store can be a collection of network-accessible services executed on computer hardware that provide multiple channels (e.g., a mobile application, voice-based search, web access, physical presences, etc.) through which customers using client computing devices can access various catalogs stored in databases to find products and services ("items") available to purchase, lease, download, stream, and the like, sometimes in the form of detail pages. These detail pages can include a large volume of information about the items, for example in the form of textual description and customer reviews.

DETAILED DESCRIPTION

Figure 1A:
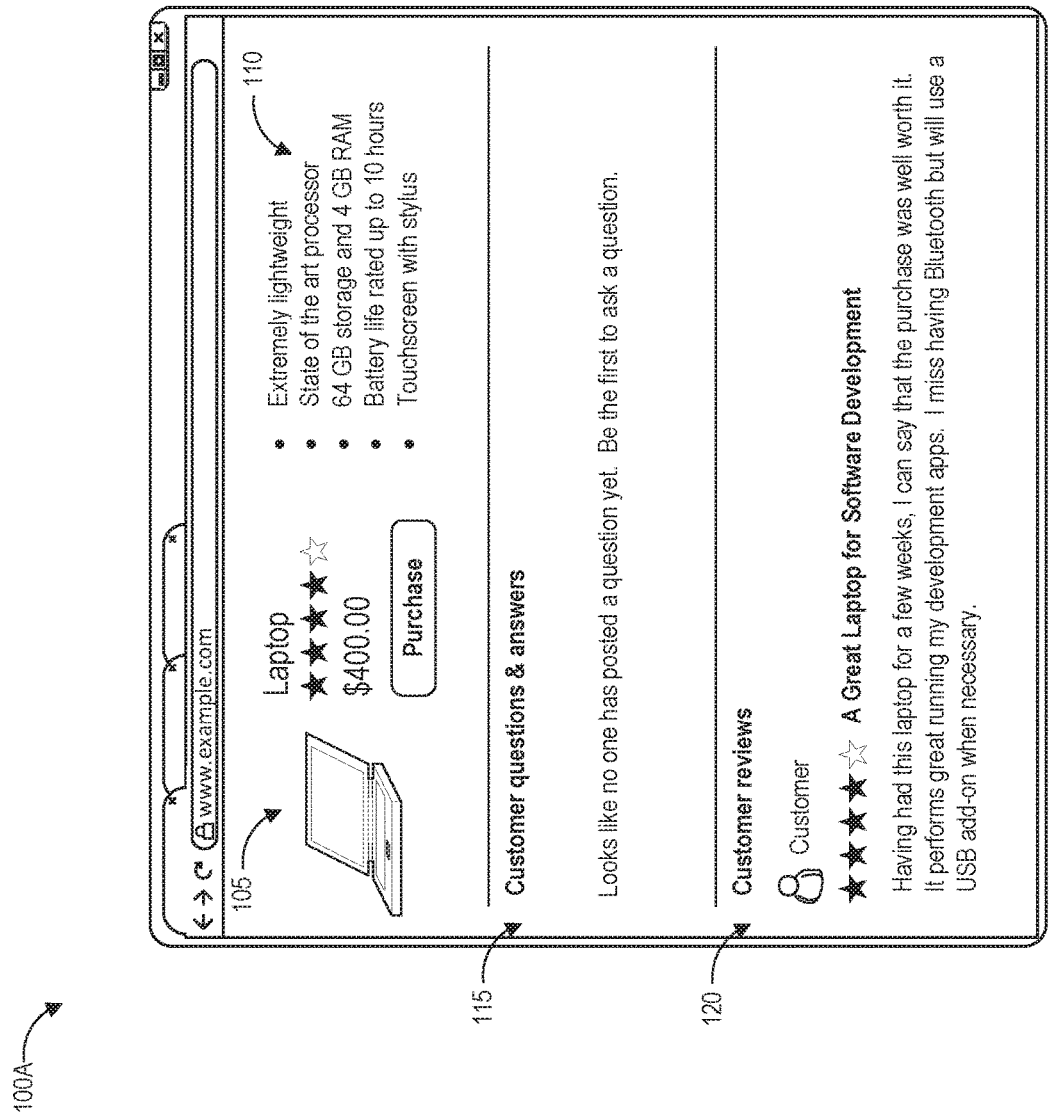
FIG. 1A depicts an example user interface presenting a detail page of an item.

Generally described, one or more aspects of the present application correspond to machine learning techniques for generating question and answer pairs relating to items in an electronic store. As described above, an electronic store can host listings for a variety of items, and can present customers with detail pages presenting information about these items in the form of seller-provided description and customer-provided reviews. The electronic store can also provide certain community-based features, for example a question and answer (QA) section of detail pages where customers can post questions requesting answers from other customers who are familiar with an item. This QA section may be surfaced on the page to make it easier for users to quickly locate information of interest. However, this QA section can face the cold start challenge: an initial set of insightful questions can facilitate additional questions and the accumulation of additional information, however initially a detail page for an item may not be populated with any question and answer pairs.

The above described problems, among others, are addressed in some embodiments by the disclosed machine learning (ML) techniques for automatically generating a set of realistic pairs of questions and corresponding answers based on existing information describing an item. These QA pairs can then be populated into the QA section of the item detail page in order to foster additional community discussion regarding item features. For example, the ML system can analyze existing customer reviews of an item and/or seller-provided description of the item to identify good candidate sentences to use as input into the QA generation model. During training, these can be review sentences that are similar to both an existing question and its corresponding answer in existing QA pairs for an item, so that the ML QA generation model can learn to predict the QA pair from that sentence. During use of the trained ML QA generation model, sentences can be evaluated using a variety of criteria such as length, grammar, spelling, similarity with the seller-provided item description, and similarity with other review sentences in the review set for this item. The ML QA generation model can use a number of selected sentences to generate a set of different QA pairs relating to the item, and the QA pairs populated into the item detail page can be selected from this set, for example by determining similar clusters of QA pairs and selecting a QA pair from the largest cluster or clusters. Multiple QA pairs can also be selected based on diversity from one another, and/or based on having different answers.

The disclosed ML QA generation model can use three recurrent neural networks (RNNs) to generate the QA pairs. A first of these RNNs can be considered as a "shared encoder," as it processes the seed sentence and provides its output to both a question decoder RNN and an answer decoder RNN. The question decoder can receive the output of the shared encoder and process it according to its learned parameters to generate a sequence of question states, which can be mapped to a known vocabulary in order to generate a question. Further, the shared encoder output can be combined with these question states and provided to the answer decoder, which can determine an answer to the question based on its learned parameters. Further details of this multi-task ML architecture and its associated training techniques are described in more detail below.

As would be appreciated by one of skill in the art, the use of a ML system for automated QA pair generation, as disclosed herein, represents a significant technological advance over prior implementations. Specifically, the task of navigating a large volume of item data to determine aspects of interest can be burdensome and time consuming for users, especially as they have to locate and navigate to the data they are looking for. This can be particularly true for computing devices with small screens, where smaller quantities of information can be displayed to the user at a time and thus navigation of larger volumes of information is more difficult. The disclosed ML techniques and QA populated user interfaces simplify this task by surfacing relevant details in a concise, QA format so that users can more quickly and easily assess item aspects of interest. By populating these QA pairs into item detail page user interfaces, the disclosed technology allows users to make decisions about whether they are interested in certain items with fewer clicks, taps, or other interactions (e.g., by not having to read through large volumes of item reviews). This improved discoverability can also reduce load on the system by the users not having to navigate through as many pages (e.g., not having to load review pages but rather finding the information they want on the item detail page). Accordingly, the disclosed simplified user interfaces represent a technological advance over existing systems.

Further, the parameter sharing of the disclosed ML architecture represents another technological advance. For example, parameters are shared between the shared encoder and each of the question decoder and answer decoder. This can be more efficient in terms of memory and processing usage than direct text-to-text systems, because the same encoder is used to feed a hidden state representation of the seed sentence into both decoders. Further, this shared encoder architecture provides the benefit of relatedness between the question and answer, giving the computing system the ability to generate a realistic, natural sounding QA pair (e.g. a QA pair that appears to have been written by a human or humans). By training the question encoder based on known answers to training questions during the training phase, the question encoder can learn (e.g., by programmatically obtaining a set of parameters) how to generate better questions, because it also encodes knowledge of the answers into its learned parameters. As such, the embodiments described herein represent significant improvements in computer-related technology.

As used herein, the term "item," in addition to having its ordinary meaning, is used interchangeably to refer to an item itself (e.g., a particular product) and to its description or representation in a computer system or electronic catalog. An item may also be a service, for example a cloud computing service offered by the electronic catalog, or a value-added service (e.g., setup, installation, maintenance) associated with a physical product. As will be apparent from the context in which it is used, the term may also sometimes be used herein to refer only to the item itself or only to its representation in a computer system.

Although certain examples presented herein use sentences as input into the ML model, it will be appreciated that the input data is not limited to the grammatical structure of a sentence, and in other implementation can use phrases or clusters of sentences. As used herein, an "embedding" refers to a learned representation of features of a sentence or other form of textual description. An embedding can be a vector, matrix, or other data format consumable by machine learning models.

The present disclosure provides examples in the context of an electronically hosted store of items. It will be appreciated that implementations of the disclosed ML QA generator can be used for other types of items represented by text where community QA features may be desirable, for example information sources regarding restaurants or other business establishments, television shows, movies, and the like.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example ML QA Generation Systems and Techniques

FIG. 1A depicts an example user interface presenting a detail page 100A of an item. Although this example relates to a physical product (the laptop), the disclosed QA generation techniques can be applied to other types of items, including streaming media such as music and movies, other types of digital files that are available for streaming or download, or services (e.g., assembly services, maintenance services, warranty services). The detail page 100A includes an image 105 depicting the item and seller-provided description 110 of the item, which in this example is a laptop. The detail page 100A also includes a star rating, the price of the item, and a user-selectable feature to purchase the item. Some implementations can include additional information relating to shipping cost and timeframe, identification and rating of a seller providing the item. In addition, the detail page 100A includes a QA section 115 where users of the electronic store can post questions about the item and receive answers, either from the seller or from other users who have purchased or otherwise interacted with the item. In this example, the QA section 115 has not yet been populated with any user-provided questions. The detail page 100A also includes a customer review section 120 where users can post textual reviews of the item. As illustrated, although the QA section 115 is empty, the customer review section 120 includes at least one review.

As illustrated in FIG. 1A, the QA section 115 can be surfaced above (e.g., positioned in a location the user will see before) the review section 120. This can beneficially provide a more concise listing of information on topics of interest before the more detailed reviews. As described above, it can be difficult and time consuming for users to locate particular information of interest in a large body of long reviews, and so the QA section 115 can make it easier to quickly learn facts of interest about an item. However, in this example the QA section 115 does not have any questions, which can have the unintended effect of discouragint users from asking questions about the item.

Figure 1B:
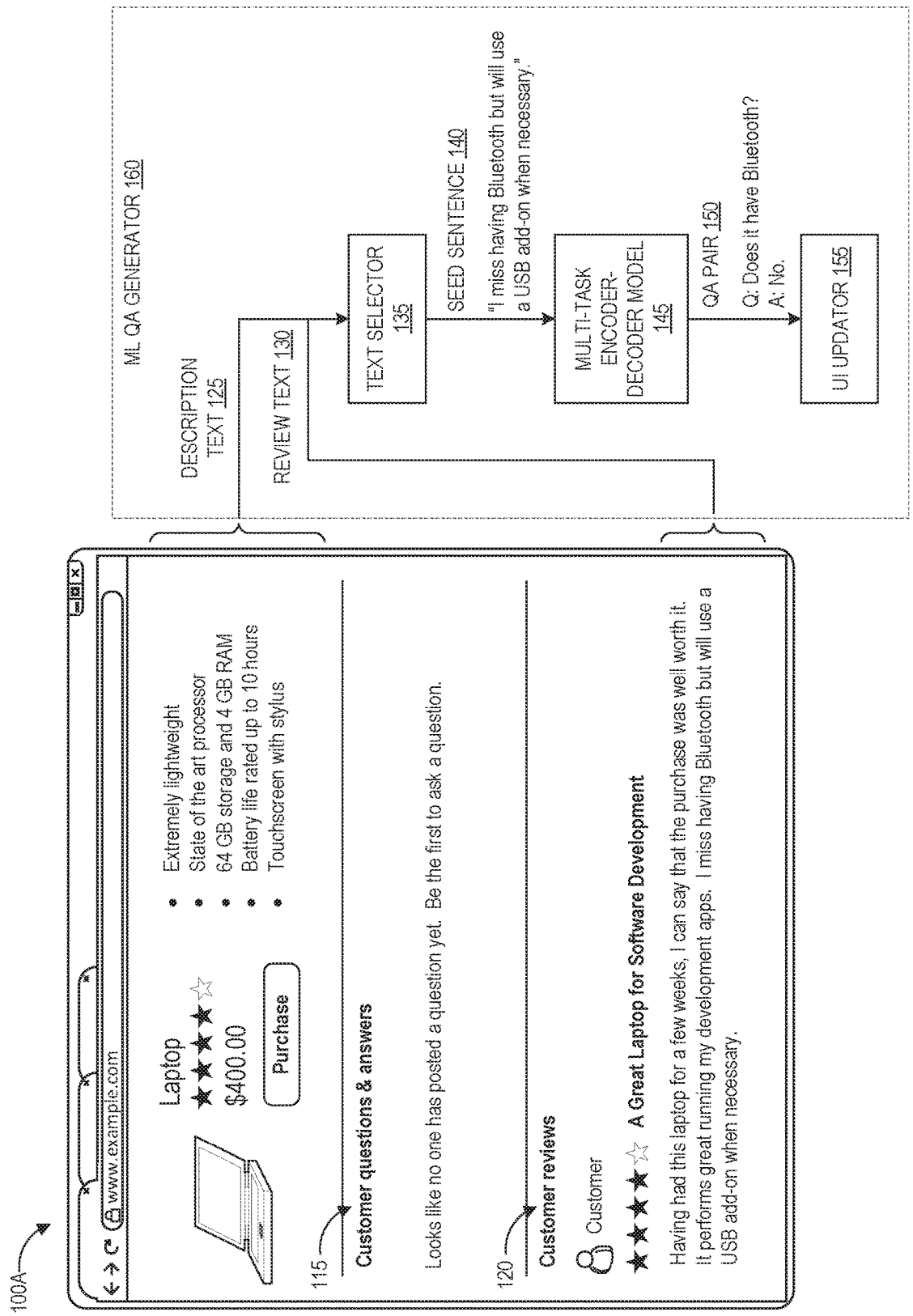
FIG. 1B depicts a graphical overview of the use of a machine learning model to process the information presented in the user interface of FIG. 1A in order to generate a question and answer pair.

In order to remedy the above-described cold start problem with the QA section, FIG. 1B depicts a graphical overview of the use of a machine learning model—the ML QA generator 160—to process the information presented in the user interface 100A in order to generate a question and answer pair 150. Here, a text selector 135 can receive the description text 125 and review text 130 in order to select a seed sentence 140 to use as input into the multi-task encoder-decoder model 145 that generates the QA pair 150. Although the example of FIG. 1B depicts using a single seed sentence 140 to generate a single QA pair 150, some implementations may identify multiple seed sentences, use these to generate a corresponding number of QA pairs, and then select one or more of the generated QA pairs for presentation on the detail page. Further, as described herein, some implementations can use non-textual information to generate a QA pair, for example the item image 105, other images of the item, and audio information about the item (e.g., from a seller's explanation video or a customer video review).

Although FIG. 1B shows both the question and answer depicted in the QA section 115, some implementations may display only the question. In these scenarios, the benefit of seeding the QA section 115 with initial data can still be achieved, and users may submit their own answers to the question. As described with respect to the parameter sharing below, one reason for also generating answers is to improve the quality of the generated questions, however there may not be a mechanism to guarantee that a generated answer actually answers the generated question. Accordingly, even if only the question is displayed, the system can still benefit from learning to generate both a question and an answer.

The text selector 135 can use a variety of criteria to determine which sentence or sentences to use. Some implementations of the text selector 135 may impose a word count limit on seed sentences, for example sentences that are not shorter than five words and not longer than 300 words (though this range can be altered for other implementations). Some implementations of the text selector 135 may also have spelling and/or grammar related criteria, and can perform automated spell and grammar checking on sentences to select seed sentences having fewer than a threshold number of errors, or higher than a threshold spelling and/or grammar score. Similarly, spelling and/or grammar criteria and associated evaluations, as well as content filters, can be used to change a weight associated with certain words or omit certain words or phrases (e.g., potentially offensive content, parental controls, etc). Some implementations of the text selector 135 can identify seed sentences based on computing similarity between a particular sentence in a review of an item and other sentences in the corpus of customer reviews of that item, or between a particular sentence in a review of an item and the seller-provided description of the item.

These similarity measures can be computed based on word or sub-word embeddings of the review sentences and description. Subword-level information can be helpful for capturing the meaning and morphology of words, especially for out-of-vocabulary entries. These embeddings can be trained on individual item description and reviews, on the descriptions and reviews of categories of items, or on the description and reviews of the entire catalog of items, in various implementations. For example, some implementations can use convolutional neural network (CNN) and recurrent neural network (RNN) subword-level composition functions for learning word embeddings.

Selected seed sentences 140 can be individually input into the multi-task encoder-decoder model 145 to generate a corresponding QA pair 150. An example architecture of the multi-task encoder-decoder model 145 is described in further detail with respect to FIG. 2A, and an example of training the multi-task encoder-decoder model 145 is described in further detail with respect to FIG. 2B. Here, the text selector 135 has selected the seed sentence "I miss having Bluetooth but will use a USB add-on when necessary." In this example, the multi-task encoder-decoder model 145 has generated the QA pair 150 with a question of "Does it have Bluetooth?" and the answer of "No." This example is drawn from an actual test performance of the ML QA generator 160, and reflects its ability to both generate natural-sounding QA pairs, and also generate QA pairs that are factual and related to the item under consideration.

The QA pair 150 and other generated QA pairs can be sent to the UI updater 155, which can select a particular QA pair or pairs to display in the QA section 115 of the detail page 100A. The UI updater 155 can implement similarity measures based on word or sub-word embeddings of the generated QA pairs (or of just the questions in the QA pairs) in order to select QA pairs. For example, the UI updater 155 can cluster similar questions together (e.g., questions within a threshold level of similarity from one another) and can determine which cluster has the most questions. A particular question can be selected from this cluster, for example randomly, or intelligently based on one or more of its similarity to the item description, grammar score, or similarity to user-provided questions for similar items. Some implementations can select a set of questions based, for example, on having different answers (e.g., "No" and "Yes"), or based on the set of questions having a high diversity (measured based on differences between the embeddings of the questions). Some implementations can perform manual or automated evaluation of naturalness (e.g., how natural the question sounds), adequacy (e.g., how adequate the question is for this item), and relatedness (e.g., how well the answer relates to the question) in order to select particular QA pairs.

Figure 1C:
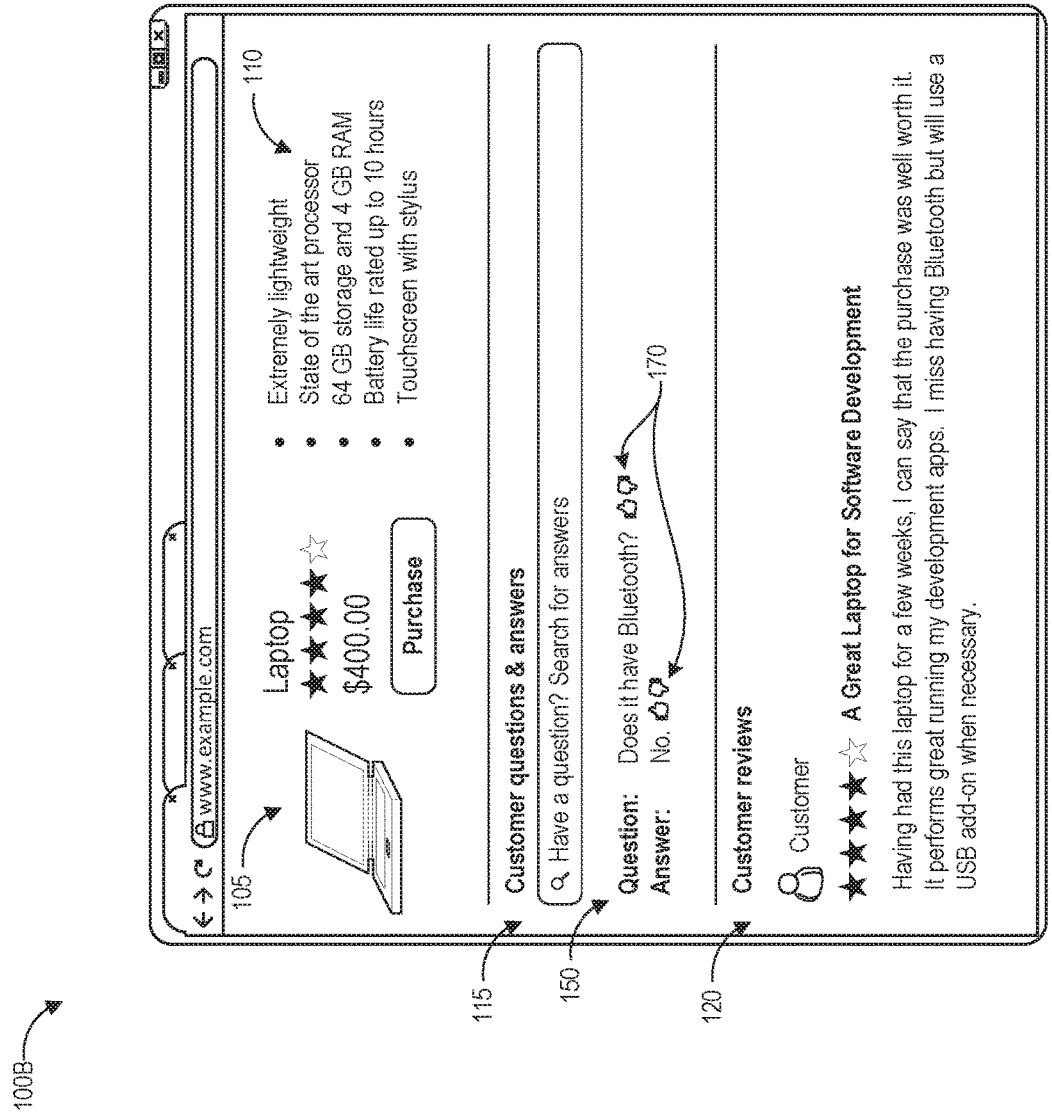
FIG. 1C depicts an example of the user interface of FIG. 1A, updated with the question and answer pair generated by the machine learning model of FIG. 1B.

After selecting a QA pair 150 or set of QA pairs, the UI updater 155 can update instructions for generating the detail page 100A to include the selected QA pair(s). Thereafter, when users of the electronic store visit that detail page (e.g., by selecting a navigational link that leads to the detail page), the page output to these users can include the computer-generated QA pair(s). FIG. 1C depicts an example of the user interface 100B updated with the question and answer pair 150 generated by the ML QA generator 160. As illustrated, the QA pair 150 relating to whether the laptop has Bluetooth now appears in the QA section 115. Beneficially, this both presents this information to users in a concise manner, and the presence of an existing QA pair can also facilitate further community discussion about the item. FIG. 1C also depicts an example voting mechanism 170 in the form of selectable thumbs-up and thumbs down icons that can be provided for users to indicate whether questions and/or their answers are helpful or unhelpful. These votes can be used to select good QA pairs from existing customer-provided QA pairs during training, to weight training data, and to provide feedback for retraining based on user voting on computer-generated questions and/or answers.

Figure 1D:
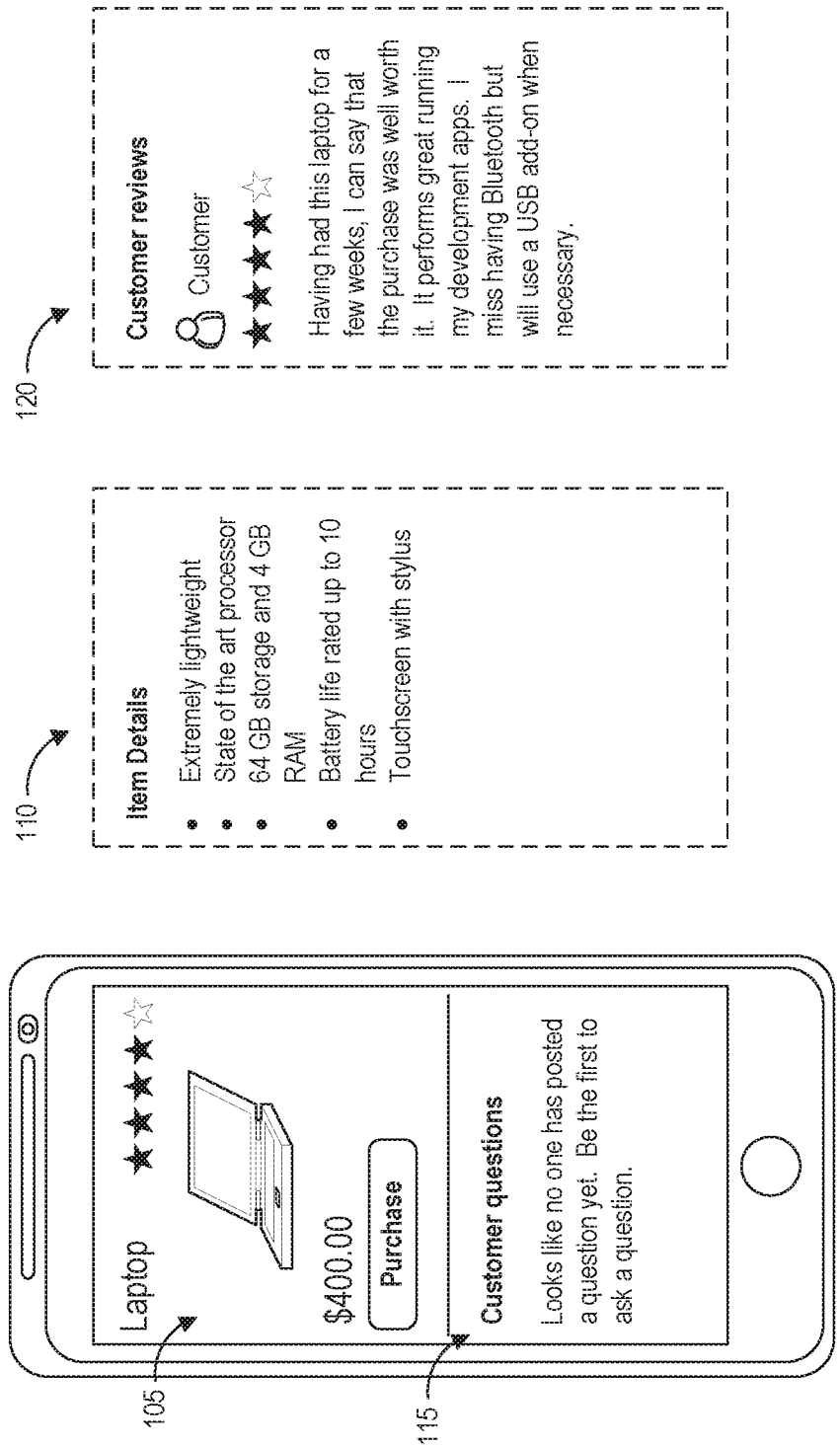
FIG. 1D depicts an example of the user interface of FIG. 1A adapted for mobile presentation.

FIG. 1D depicts an example of the user interface of FIG. 1A adapted for mobile presentation. Due to the smaller screen size of mobile devices, the information about the item is presented in a more compact way. For example, the initial page displayed to the user can include the item image 105, price, rating, title, and purchase button, as well as the QA section 115. The item details 110 and customer reviews 120 may be displayed on different pages, for example another page that the user can scroll to or can navigate to using a selectable link. Due to the more compact space limitation, the QA section 115 can be particularly important for concisely conveying item information to users on mobile devices. FIG. 1D also shows the QA section 115 unpopulated with any questions or answers.

Figure 1E:
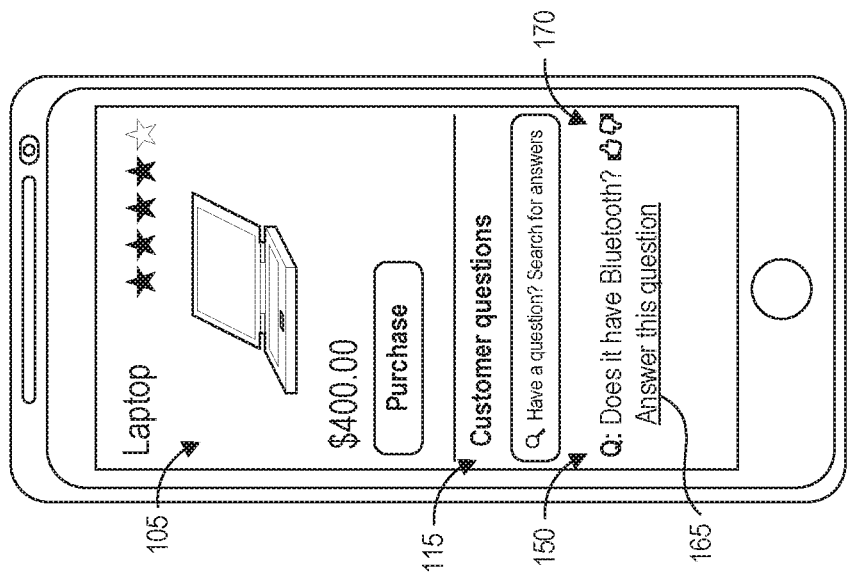
FIG. 1E depicts an example of the user interface of FIG. 1D, updated with the question generated by the machine learning model of FIG. 1B.

FIG. 1E depicts an example of the user interface of FIG. 1D, updated with the question generated by the machine learning model of FIG. 1B. FIG. 1E also depicts a user-selectable option 165 for a customer to answer the computer-generated question. Some implementations may display an indication that the question (and answer, if displayed) were generated by a computer rather than a customer. FIG. 1E also depicts an example voting mechanism 170 in the form of selectable thumbs-up and thumbs down icons that can be provided for users to indicate whether displayed questions are helpful or unhelpful.

Although the examples of FIGS. 1A-1E are presented in the context of graphical user interfaces, users may additionally or alternatively interact with the electronic store via speech-based user interfaces, for example using a speech-based electronic assistant device. Such a device may be the voice-based systems of U.S. patent application Ser. No. 14/456,620, titled "Voice application architecture," filed Aug. 11, 2014, and U.S. patent application Ser. No. 14/107,931, titled "Attribute-based audio channel arbitration," filed Dec. 16, 2013, the entireties of which are hereby incorporated by reference herein. A speech-based device may present an audio description of items, for example by audibly speaking the title, QA pairs, details, and/or description of an item using recorded or synthesized speech. This audible user interface can include voice-processing functionality that enables the user to vocally request further information, answer questions about the item, and acquire the item. In speech-based user interface examples, presenting information in QA pair form can be important to save time when the user is listening to the information about the items, as users may prefer to hear a reading of compact QA pairs rather than hearing numerous lengthy reviews read aloud. These QA pairs may be computer-generated as described herein.

Figure 2A:
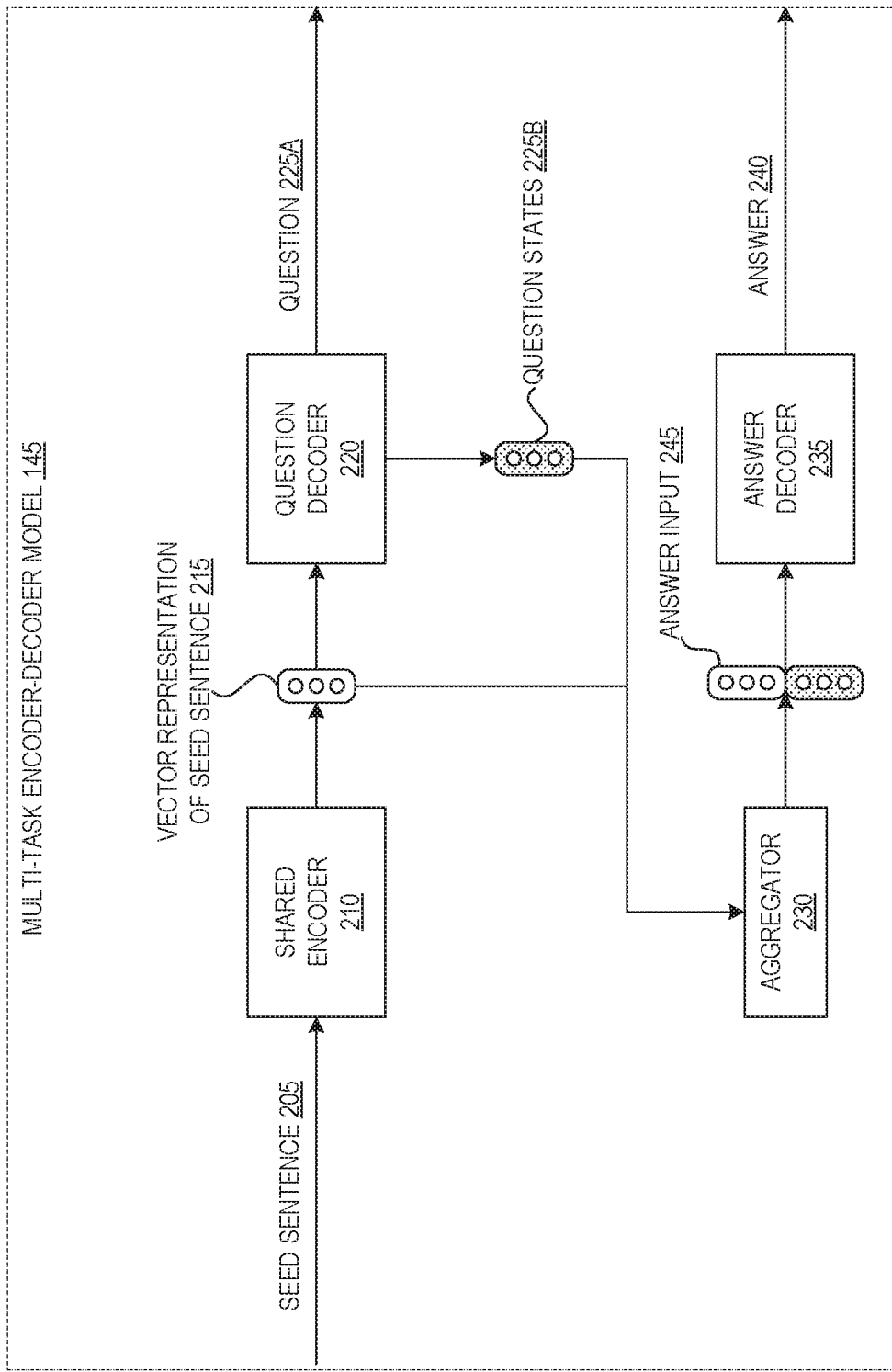
FIG. 2A depicts a schematic block diagram of the machine learning model of FIG. 1B.

FIG. 2A depicts a schematic block diagram of the multi-task encoder-decoder model 145. The multi-task encoder-decoder model 145 includes three ML models—the shared encoder 210, question decoder 220, and answer decoder 235. Generally speaking, the shared encoder 210 learns to map input sentences to feature representations referred to herein as hidden state representations of the sentence. The question decoder 220 learns to take this feature representation as input, process it to create a hidden state representation of a question, and then transform this hidden state representation into a question. The answer decoder 235 uses both the hidden state representations of the sentence and the hidden state representation of the question to produce an output answer to the question. The hidden states can be considered as learned embeddings of the sequences of sentences. This creates an encoder-decoder network with a shared encoder 210 that provides its output to both the question decoder 220 and the answer decoder 235. This approach to jointly generate questions and answers is a multi-task learning framework. As described in more detail below, the multi-task encoder-decoder model 145 uses hard parameter sharing, where the different functions mapping the input sentence to the two tasks (question and answer) share a subset of their parameters.

Each of the shared encoder 210, question decoder 220, and answer decoder 235 can be a type of recurrent neural network (RNN). Neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes that can vary between layers. The nodes in each layer connect to some or all nodes in the subsequent layer. Each node can weight and sum the inputs provided by connected nodes in a previous layer, perform an activation (e.g., ReLU, tan h, sigmoid, etc.) on the summed input, and output this activation value to connected nodes in a next layer. The weights of these connections are typically learnt from data during the training process, for example through backpropagation in which the network parameters (e.g., the connection weights) are tuned to produce expected outputs given corresponding inputs in labeled training data. Thus, an artificial neural network is an adaptive system that is configured to change its structure (e.g., the connection weights) based on information that flows through the network during training, and the weights of the hidden layers can be considered as an encoding of meaningful patterns in the data.

During training, a neural network can be exposed to pairs in its training data and can modify its parameters to be able to predict the output of a pair when provided with the input. For the present disclosure, these data pairs each include an existing QA pair for an item as the output and an identified similar sentence in a customer review of the item as the input. The multi-task encoder-decoder model 145 is trained in an end-to-end fashion by alternately minimizing individual losses for subnetwork parameters involved in generating each of the network outputs (question and answer). Further details of how the multi-task encoder-decoder model can be trained are described with respect to FIG. 1B.

It will be appreciated that the disclosed neural networks are implemented using computing hardware. For example, input layer nodes can be implemented using a memory for storing input values, a memory can be used to store the weights for the connections between nodes, and output layer nodes can be implemented using a memory for storing output values. Input values can be stored as feature vectors or embeddings, as described herein. Hidden layer nodes can be implemented using computer-executable instructions executed by hardware processing components to perform the specified computations to perform forward passes of data through the network layers.

As described above, the shared encoder 210, question decoder 220, and answer decoder 235 can each be a RNN, which is a class of artificial neural network where connections between nodes form a directed graph along a sequence. This allows the RNN to effectively model data of a sequential nature, such as a sentence. RNNs are called recurrent because they perform the same task for every element or step of a sequence (e.g., the same node is repeated for each element of the sequence), with the output being depended on the previous computations. Thus, a RNN can share the same learned parameters across all steps. This RNN node uses computations from a previous state in computing the output for the next state, which gives the RNN a "memory" which captures information about what has been calculated so far. For example, if the sequence being analyzed is a sentence of five words, the node of the RNN would be repeated to form a 5-layer neural network, one layer for each word. At each time step (e.g., each instance of the node), the RNN can compute an output based on the input (e.g., an embedding corresponding to a particular word in the sentence) and a hidden state (representing the memory of the network) calculated based on the previous hidden state and the input at the current step. Accordingly, RNNs, for example long short-term memory neural networks ("LSTMs") and gated recurrent unit neural networks ("GRUs") have emerged as powerful models for language processing.

In some implementations, the shared encoder 210, question decoder 220, and answer decoder 235 can be bi-directional LSTMs. A bi-directional LSTM can be implemented as two instances of an LSTM that cooperate to generate an output, where a first instance processes a sentence in a forward direction and a second instance processes the sentence in a backward direction, such that the output is generated from both past and future contexts. For example, for the seed sentence "I miss having Bluetooth but will use a USB add-on when necessary," the forward instance of the LSTM can treat "I" as the first time step, "miss" as the second time step," "having" as the third time step, and so forth. The backward instance of the LSTM can treat "necessary" as the first time step, "when" as the second time step, "add-on" as the third time step, and so forth.

In some implementations, the shared encoder 210 may be a different form of neural network than the question decoder 220 and answer decoder 235, or may include multiple different neural networks that cooperate to generate the vector representation 215. For example, if the input data includes image data, the shared encoder 210 can use a CNN to generate an embedding of the image data. CNNs and RNNs may also be used for processing audio waveform data. Some implementations of the shared encoder 210 can use multiple linked data types as input into multiple different models to generate the vector representation. For example, a customer review can include text, an image, and a video (collectively referred to as media describing the item). The text of the review may be identified as similar to the seller-provided description, and these multiple forms of data can be input into different ML models with their outputs combined to form the vector representation 215. For example, the text can be input into a bi-directional LSTM, the image can be input into a CNN, and the audio waveform from part of all of the video can be input into another CNN or an RNN. Certain frames from the video may also be input into the shared encoder 210. In some implementations users may interact with an electronic store through a speech-based user interface, and their verbal reviews can be processed to generate QA pairs as described herein. For example, the audio waveform can be directly input into a CNN or RNN, or speech-to-text processing can be performed to generate a textual sentence for input into a bi-directional LSTM.

Turning specifically to the flow of data through the multi-task encoder-decoder FIG. 2A illustrates how a seed sentence 205 is fed into the shared encoder 210. As described above, although this example presents input in the form of a sentence, phrases (e.g., not complete sentences) or groups of sentences, paragraphs, or any text span can be used in other implementations. For example, embeddings of each word in the seed sentence 205 can be fed into sequential nodes of an RNN. For example, the shared encoder 210 can compute a sequence $c=(c_1 \ldots c_T)$ of hidden representations of the input x (here, seed sentence 205) for every time step t (1 through T) (also called a context), using an encoder RNN function enc:

$$c_t = \text{enc}(x_t, c_{t-1}) \qquad (1)$$

The vector representation 215 of the seed sentence 205 depicted in FIG. 2A can be this sequence $c=(c_1 \ldots c_T)$, which is the sequence of hidden representations of the seed sentence encoded by the shared encoder 210. This can be provided as input into the question decoder 220, which can predict the optimal question $\hat{q}$ as:

$$\hat{q} = \text{argmax } \Pi_t P_{QG}(q_t | \langle q_1 \ldots q_{t-1}, c \rangle) \qquad (2)$$

where $P_{QG}$ is a conditional probability computed based on a previously generated output, a state $s_t$, and the context c:

$$p(q_t | \langle q_1 \ldots q_{t-1}, c \rangle) = u(q_{t-1}, s_t, c) \qquad (3)$$

Here, u is a function that transforms the hidden question states $\langle q_1 \ldots q_T \rangle$ into output probabilities (e.g., probabilities for each word in the output vocabulary), for example via a dense projection and a nonlinearity, followed by a softmax function. This can be a fully connected layer that computes the probability that a particular question state is each of the words in the output vocabulary, where the number of nodes in this layer corresponds to the number of words in the vocabulary, and the sum of all output probabilities adds to one. Thus, the output node with the highest probability can identify the word for a particular state of the output question 225A. The state $s_t$ is given by a decoder RNN:

$$s_t = \text{dec}(q_{t-1}, s_{t-1}, c) \qquad (4)$$

where dec is a decoder RNN function, for example a bi-directional LSTM network. The question 225A is formed as a sequence of words identified from the output question vocabulary based on these output probabilities.

The question states $\langle q_1 \ldots q_T \rangle$ 225B can be aggregated (e.g., at aggregator 230) with the vector representation 215 of the seed sentence 205 $\langle c_1 \ldots c_T \rangle$ to form the answer input 245 for the answer decoder 235. In some implementations the aggregator 230 may concatenate the two vectors. It can also pull these two together and include pairwise interaction terms (e.g., by learning how to multiply or add certain terms of the vectors together). The answer generation (AG) model is similar to the question generation (QG) model, with the output sequence probability â again computed by a decoder function:

$$\hat{a} = \text{argmax } \Pi_t P_{AG}(a_t | \langle a_1 \ldots a_{t-1}, \tilde{c} \rangle) \qquad (5)$$

These conditional probabilities $P_{AG}$ are computed from a previous output, some state $z_t$ (computed according to equation (4) above), a projection v (analogous to u above), and an array of answer context vectors:

$$p(a_t | \langle a_1 \ldots a_{t-1}, \tilde{c} \rangle) = v(a_{t-1}, z_t, \tilde{c}) \qquad (6)$$

However, the answer model differs from the question model in that it is implicitly conditioned on the learned parameters of the question decoder 220, concatenating the states $s_t$ computed by the fully unrolled question decoder 220 with the shared encoder hidden states $c_t$ to generate an augmented context $\tilde{c} = \langle \tilde{c}_1 \ldots \tilde{c}_T \rangle$ (the answer input 245). Here, $\tilde{c}_t = [c_t, s_t]$, where [•,•] denotes vector concatenation. In sharing the weights used to compute the hidden encoder states $c_t$ as well as the ones in the generation decoder between the QG and AG models, both are updated alternately as each of the two tasks are optimized, as described in further detail with respect to FIG. 2B. Similar to the question decoder 220, the answer decoder 235 can also use a dense projection and a nonlinearity followed by a softmax function to determine the probability of each state of the answer being a particular word in the output answer vocabulary.

The question decoder 220 during testing was able to generate questions that were rated by manual reviewers as adequate for the items for which the questions were generated. One example was generated for a rechargeable power pack, where the seed sentence from an existing customer review was "Under normal use, the batteries last a few days," and the generated question was "How long does the battery last?" In this example, the review sentence explicitly answers the generated question, and so the answer generated by the answer decoder 235 can be highly related to the question. Another example is described above for a laptop with respect to FIGS. 1A-1C. In that example, the review sentence "I miss having Bluetooth but will use a USB add-on when necessary" only implicitly answers the question of "Does it have Bluetooth" but the answer decoder 235 was able to pick up on the answer "No" from the implicit statement in the review sentence. In some test implementations, the question decoder 220 generated questions with additional polite expressions learned from the training data. For instance, one example generated question is "Is it possible to remove the laptop? Thanks!"

In some test implementations, over 50% of the generated answers by the answer decoder 235 were "yes" or "no." Some generated answers may not have answered the generated question, however users of the catalog can submit their own answers to the question, and the focus of the disclosed ML techniques can be to generate questions to promote user engagement with the community QA feature.

As described above, some implementations during inference (e.g., use of the trained model to generate new data) may only require a generated question for display on an item detail page. In such implementations, the parameters of the question encoder may be trained based on minimizing losses from the output of the answer decoder as described above. However, the answer decoder may be dropped from the inference instance of the multi-task encoder-decoder model 145 in order to save processing time, processing resources, and memory resources, as its output may not be needed. In such implementations, the parameters of the trained question decoder 220 would still reflect the insight learned based on training the system with answer decoder 235.

Figure 2B:
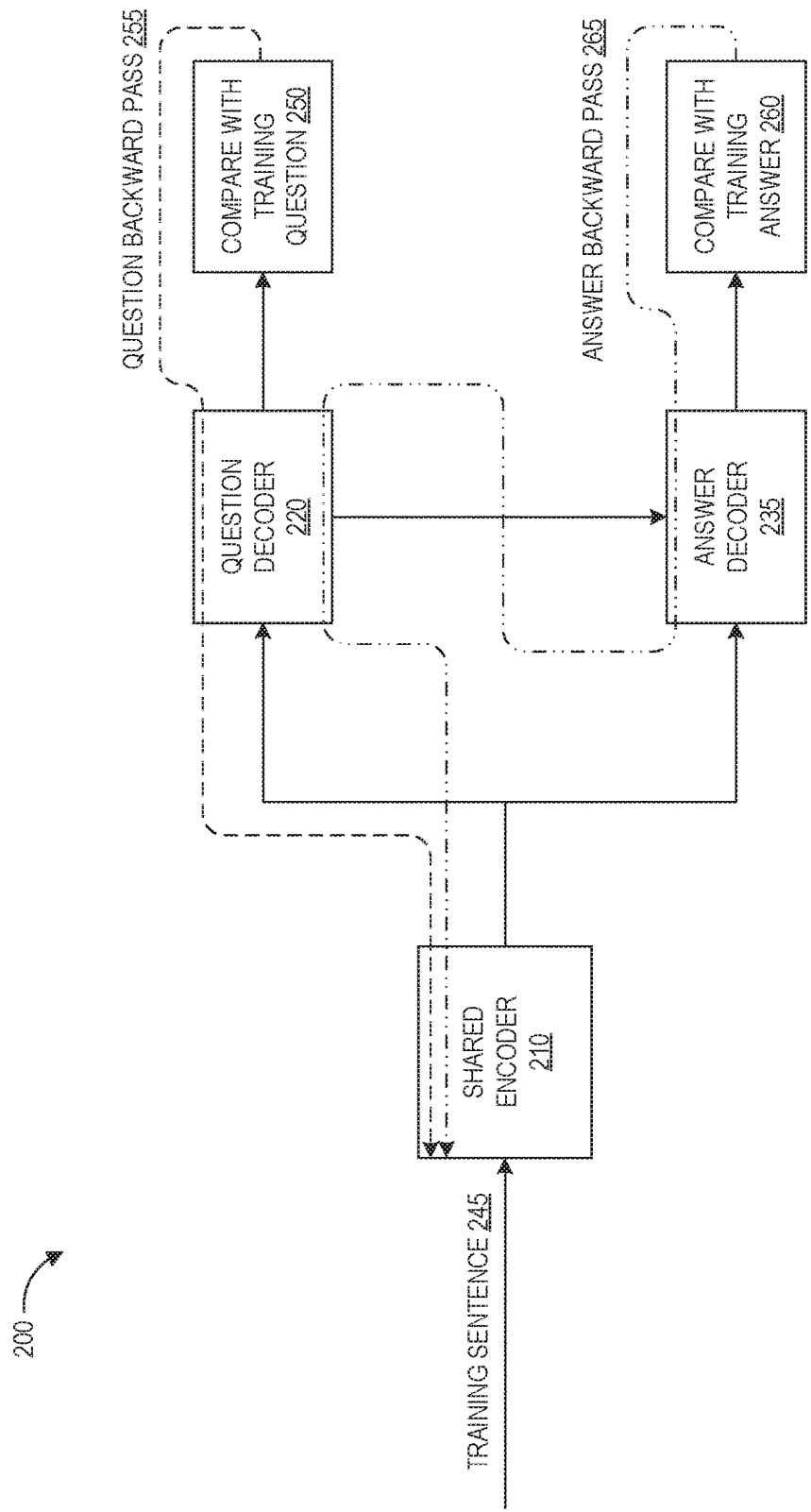
FIG. 2B depicts examples of backpropagation pathways for training the machine leaning model of FIG. 2A.

FIG. 2B depicts examples of training data and backpropagation pathways for training the machine leaning model of FIG. 2A. Here, the training data can consist of input review sentences and corresponding QA output pairs drawn from customer provided reviews and QA pairs. Some questions may have multiple different user-submitted answers. Each of these answers paired with the question can be a separate QA pair usable for training. As described above, the text selector 135 can select training sentences using word embedding or sub-word embedding based similarity measures. For example, each sentence can have a first similarity measure computed with existing questions, and a second similarity measure computed with the answers to these existing questions. The following scoring function can be used in some implementations to quantify the similarity between a review sentence r and a QA pair ⟨q, a⟩:

$$sim(r,\langle q,a \rangle) = sim_Q(r,q) + sim_A(r,a) \qquad (7)$$

The individual function $sim_Q$ measuring similarity between question and review sentence is computed as:

$$sim_Q(r,a) = \lambda_1 sim_{tfidf}(r,q) + \lambda_2 sim_{bpe}(r,a) + \lambda_3 sim_{prod}(r,q) \qquad (8)$$

where $\lambda_1$, $\lambda_2$, and $\lambda_3$. are weights that can be set manually or learned. The measure of similarity between the answer and the review sentence $sim_A$ is computed analogously. A certain number n of review sentences and corresponding QA pairs can be selected based on having the highest n scores for equation (8). Some embodiments can additionally consider user-provided votes on the QA pairs in order to select pairs that are upvoted more than they are downvoted, or to select pairs that are most highly upvoted. Some embodiments can weight the training data based on number of upvotes, number of downvotes, or a helpfulness score generated from total upvotes and downvotes for a QA pair.

In equation (8), $sim_{tfidf}$ is the cosine similarity of the weighted averages over 100-dimensional word embeddings for all nouns, verbs, and adjectives in r and q. Tf-idf weights are computed over all questions, answers, and review sentences in the dataset. In equation (8), $sim_{bpe}$ denotes the cosine similarity of the averages over subword embeddings for all sub-words in in r and q. These subword embeddings can be computed based on byte pair Encoding. Representing in r and q by subword embeddings instead word embeddings can compensate for out-of-vocabulary words resulting from spelling variations and item-specific terms in the data. In equation (8), $sim_{prod}$ denotes the Jaccard index computed on the sets of product mentions in r and q, $$sim_{prod}(r,q) = \frac{P_r \cap P_q}{P_r \cup P_q} \qquad (9)$$

Mentions of products can be identified using natural language processing (NLP) systems with a named-entity recognition (NER) model.

In some implementations, human annotation of the training data can be collected for verifying triples of corresponding review sentences and QA pairs. For example, annotators can be presented with the item title, a question, the top ten review, and then be asked to indicate all review sentences that answer the question. In one example training implementation, the training data obtained human annotations for 65,000. Based on the annotated triples, the training can optimize the scoring function in equation (7) and use the optimized function to compute the most similar review sentence for each QA pair in the dataset. In the example training implementation, this yielded 262,087 automatically extracted triples that were used as training data.

During the training phase, the training sentence 245 can be forward passed through the shared encoder, question decoder 220, and answer decoder 235. Training can involve alternatively minimizing individual losses for the question and answer outputs. The loss functions for both the question decoder 220 and the answer decoder 235 can be categorical cross-entropy between the predicted conditional probabilities in equations (2) and (5). As shown in FIG. 2B, this alternative minimization of losses can involve two backward passes that optimize the parameters of the subnetwork (e.g., the portion of the overall multi-task encoder-decoder model) involved in generating the output. For the question backward pass 255, the output of the question decoder 220 can be compared with the training question 250, and the backward pass can optimize network parameters in the question decoder 220 and the shared encoder 210. For the answer backward pass 265, the output of the answer decoder 235 can be compared with the training answer 260, and the backward pass can optimize network parameters in the answer decoder, question decoder, and shared encoder 210. Some implementations can perform an additional backward pass for minimizing the answer losses along the path from the answer decoder 235 through the shared encode 210. This joint learning of question and answer predictions yields the parameter sharing between these two tasks. Advantageously, this can enable training from disjoint datasets and optimization of parts of a network's parameters for a given task using labels for some other task.

During training, input can be converted to all lowercase and transformed to sequences of 3,000 distinct subword units via byte pair encoding. Byte pair encoding is a form of data compression in which the most common pair of consecutive bytes is replaced with a byte that does not occur within that data, and so forth until all consecutive bytes are replaced with other bytes. A table of these replacements can be used to rebuild the original data. The embedding layer can be initialized to the 300-dimensional pretrained BPE embeddings that were also used for the training data collection, optimized as the model is trained. The bi-directional LSTMs used for the various ML models can be single-layer with 128 hidden dimensions in one implementation. In some implementations, the maximum number of time steps (individual subword units) for input and output can be 50, corresponding to around the $95^{th}$ percentile of reviews and more than the $99^{th}$ percentile of questions and answers.

Some implementations can additionally use the question backward pass 255 and/or answer backward pass 265 for retraining, that is, updating the model parameters based on new data. This new data can be generated in some implementations based on user voting on computer-generated questions or answers that indicate whether these are good or bad. Such retraining can start with the current model parameters instead of randomly initialized parameters (as in the initial training).

Figure 3:
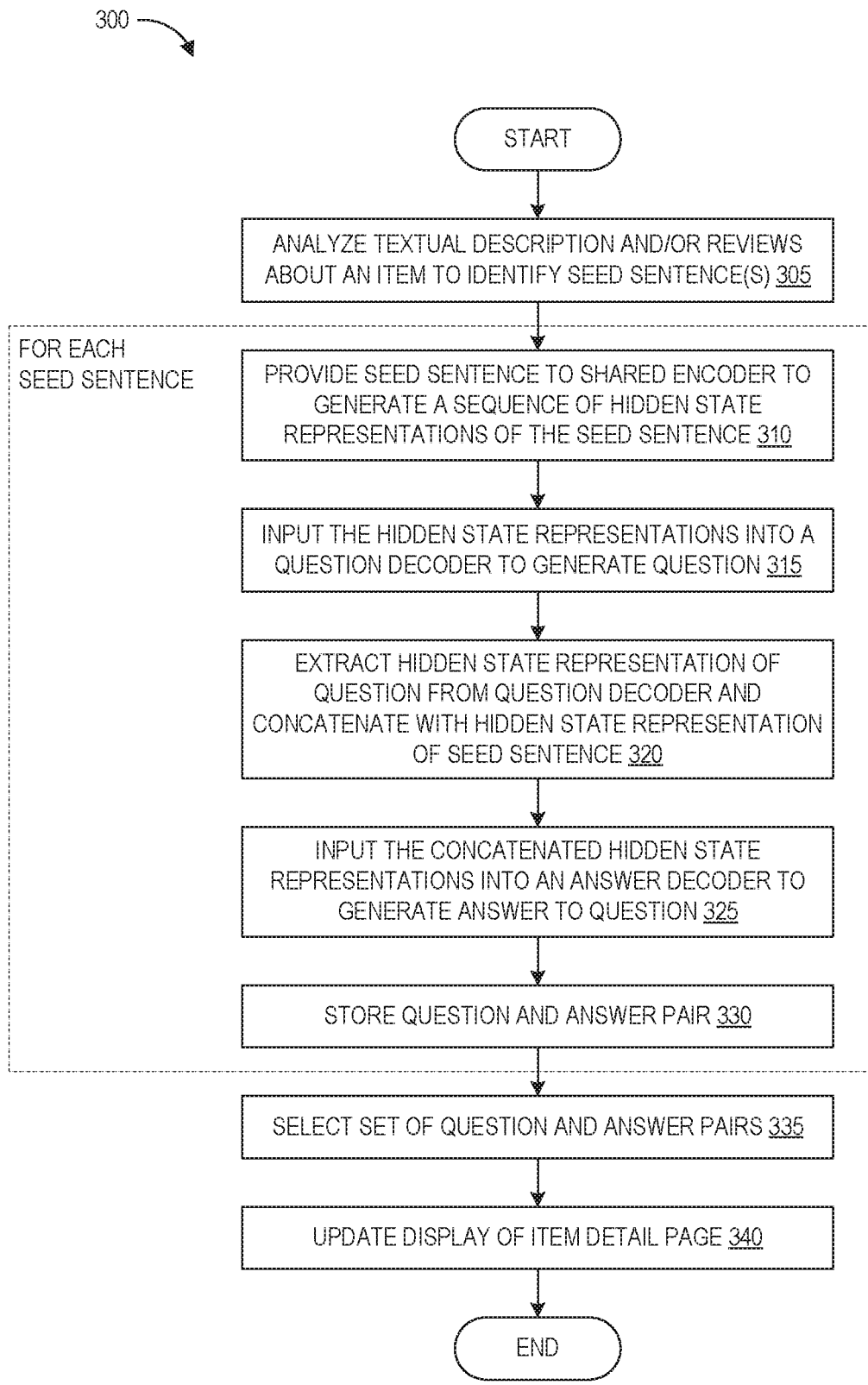
FIG. 3 depicts a flowchart of an example process for generating question and answer pairs, as depicted in FIG. 1B.

FIG. 3 depicts a flowchart of an example process 300 for generating question and answer pairs, as depicted in FIG. 1B. At block 305, the text selector 135 can analyze the textual description and/or reviews of an item to identify seed sentences for use in generating QA pairs. Block 305 may be performed periodically on data representing items that are identified as having one or more reviews and a seller-provided item description, but not any user-provided QA.

At block 310, the seed sentence can be provided to the shared encoder 210 to generate a sequence of hidden state representations of the seed sentence, as described above. At block 315, this hidden state representation can be input into the question decoder 220 to generate a question. As described above, in this manner the question is automatically generated based on the existing review sentence provided by a user of the electronic store.

At block 320, the system can extract a hidden state representation of the question states from the question decoder 220 and concatenate it with the hidden state representation of the seed sentence. At block 325, this concatenated vector is provided to the answer decoder 235 in order to generate an answer to the question. As described above, using the concatenated vector enables the answer decoder 235 to generate the answer based on both the initial review sentence and on the generated question, such that the answer and question are related.

At block 330, the system can store the QA pair in association with an identifier of the item. As shown by the dashed box, blocks 310-330 can be repeated for a number of different seed sentences from the customer review data in order to generate a pool of candidate QA pairs relating to this item.

At block 335, the UI updater 155 can select a set of QA pairs for display on the item detail page. As described above, in some implementations a QA pair can be selected based on clustering similar questions together and selecting a QA pair having a question in the largest cluster. Additional QA pairs can be selected based on diversity with this initial selected QA pair, and with each other, up to a predetermined set size. In addition, the selected QA pairs can be identified based on having a high degree of similarity to the seller-provided item description. These similarity and diversity measures can be computed using word embeddings and/or subword embeddings as described above.

At block 340, the UI updater 155 can update the instructions for displaying the item detail page to include the selected set of QA pairs in the QA section. Thereafter, the electronic store can cause output of this page to a user device when a user requests to view the detail page of the item. In some implementations, after a certain number of user-provided questions are accrued for this item, the UI updater 155 may remove the computer-generated questions from the QA section, while other implementations may leave the computer-generated questions in the set.

In this manner, using a multi-task encoder-decoder model, the disclosed ML system is able to generate natural questions which are adequate for the items they concern, in order to help users more efficiently locate information of interest about items, and in order to foster community discussion about items via the QA user interface features.

Execution Environment

Figure 4:
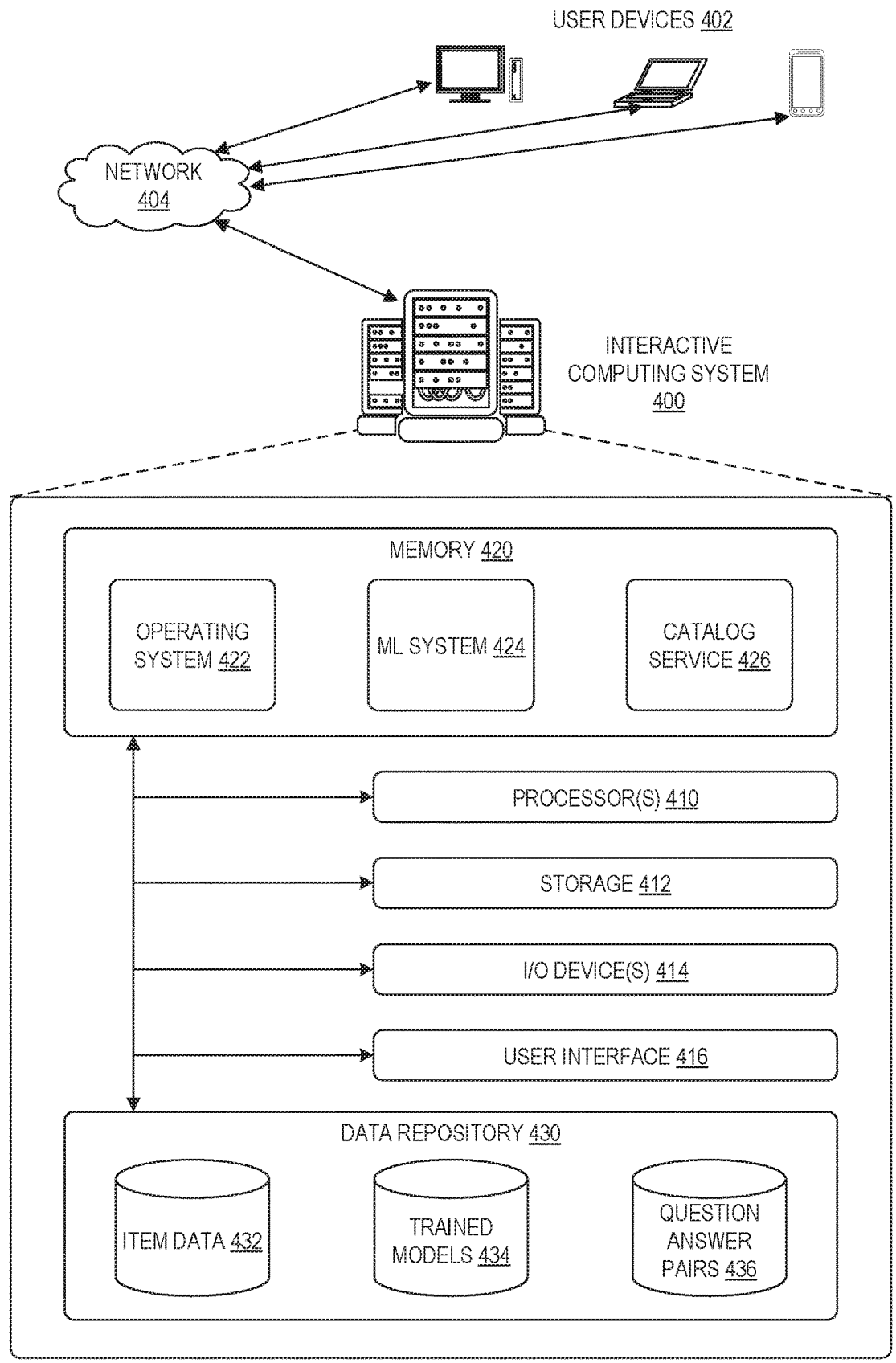
FIG. 4 illustrates a schematic block diagram of an example interactive computing environment for performing the machine learning question and answer generation of FIGS. 1B and 3, and providing associated user interfaces.

FIG. 4 is a block diagram of an illustrative computing system 400 configured to implement the above-described processes to train and implement a ML Q&A generator 160 and generate associated user interfaces, as described herein. The architecture of the interactive computing system 400 includes a memory 420 in communication with a processor 410, which can be in direct communication with one another or distributed among computing devices within a networked computing system and in communication with each other. Components used for the architecture may depend at least in part upon the type of network and/or environment selected.

As depicted interactive computing system 400 may include one or more computers, perhaps arranged in a cluster of servers or as a server farm. The memory and processors that make up these computers may be located within one computer or distributed throughout many computers (including computers that are remote from one another) as detailed herein. These servers may be configured to intelligently display and configure multi-offer user interfaces, as described herein. For example, the interactive computing system 400 may be configured to manage user interfaces displayed in connection with an electronic store.

The interactive computing system 400 may include at least one memory 420 and one or more processing units (or processor(s)) 410. The memory 420 may include more than one memory and may be distributed throughout the interactive computing system 400. The memory 420 may store program instructions that are loadable and executable on the processor(s) 410 as well as data generated during the execution of these programs. Depending on the configuration and type of memory, the memory 420 may be volatile (such as RAM and/or non-volatile (such as read-only memory ("ROM"), flash memory, or other memory). In some examples, the memory 420 may include multiple different types of memory, such as static random access memory ("SRAM"), dynamic random access memory ("DRAM"), or ROM.

The memory can store the program instructions as a number of modules that configure processor(s) 410 to perform the various functions described herein, for example operating system 422, ML system 424, and catalog service 426. The memory 420 may include operating system 422 for interacting with the interactive computing system 400. The ML system 424 can include the ML Q&A generator 160, a training module configured to implement the training workflow described above, instructions regarding when to perform retraining and what data to collect for retraining, and an inference module configured to implement the process 300. The ML system 424 can also include a feedback component that may re-train the prediction model 290 based on user-provided answers to computer-generated questions, or user-provided feedback on computer-generated QA pairs.

Users can browse an electronic catalog provided by the catalog service 426 to obtain information about electronic catalog content stored in an item data repository 432. The electronic catalog content can include detailed information about these products. In one embodiment, this content is arranged in a hierarchical structure, having items associated with one or more categories or browse nodes in a hierarchy (or graph). The catalog service 426 can provide functionality for users to browse the item hierarchy in addition to searching the catalog. Users can acquire items via offers generated by the disclosed techniques. The catalog service 426 can also provide functionality users to participate in community features such as the disclosed QA sections of item detail pages.

The processor 410 includes one or more general purpose computers, dedicated microprocessors, graphics processors, or other processing devices capable of communicating electronic information. Examples of the processor 410 include one or more application-specific integrated circuits ("ASICs"), for example ASICs purpose built for machine learning training and/or inference, field programmable gate arrays ("FPGAs"), digital signal processors ("DSPs") and any other suitable specific or general purpose processors. The processor 410 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 400 may also include additional storage 412, which may include removable storage and/or non-removable storage. The additional storage 412 may include, but is not limited to, magnetic storage, optical disks, and/or tape storage. The disk drives and their associated computer-readable media may provide non-volatile storage of computer-readable instructions, data structures, program modules, and other data for the computing devices. The memory 420 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 400 may also include input/output (I/O) device(s) and/or ports 414, such as for enabling connection with a keyboard, a mouse, a pen, a voice input device, a touch input device, a display, speakers, a printer, or other I/O device.

The interactive computing system 400 may also include a user interface 416. The user interface 416 may be provided over the network 404 to user devices 402 and utilized by a user to access portions of the interactive computing system 400. In some examples, the user interface 416 may include a graphical user interface, web-based applications, programmatic interfaces such as application programming interfaces ("APIs"), or other user interface configurations. The user interface 416 can be generated as described herein to provide computer-generated QA pairs on a detail page for a particular item.

The interactive computing system 400 may also include a data store 430. In some examples, the data store 430 may include one or more data stores, databases, data structures, or the like for storing and/or retaining information associated with the interactive computing system 400. Thus, the data store 430 may include data structures, such as an item data repository 432, offer data repository 434, and seller data repository 436.

The item data repository 432 comprises one or more physical data storage devices that stores data representing the items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog. The item data repository 432 also stores data representing item information, including the attributes used to generate input data for the ML techniques described herein. The catalog service 426 can access electronic catalog or other item data from item data repository 432.

The trained models data repository 434 comprises one or more physical data storage devices that stores data representing the parameters of the models of the multi-task encoder-decoder model 145. The QA pairs data repository 436 comprises one or more physical data storage devices that stores information regarding generated QA pairs, including information representing similarity of generated QA pairs to one another and/or to seller-provided item description, or diversity of a set of selected QA pairs.

The interactive computing system 400 can communicate over network 404 with user devices 402. The network 404 can include any appropriate network, including an intranet, the Internet, a cellular network, a local area network or any other such network or combination thereof. User devices 402 can include any network-equipped computing device, for example desktop computers, laptops, smartphones, tablets, e-readers, gaming consoles, and the like. Users can access the interactive computing system 400 and interact with items therein via the network 404, and selling partners can be provided with predictions as described herein via the network 404.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks and modules described in connection with the embodiments disclosed herein can be implemented or performed by a machine, such as a processor device, a DSP, an ASIC, an FPGA, or other programmable logic device, discrete gate or transistor logic, discrete hardware components, or any combination thereof designed to perform the functions described herein. Moreover, the various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a memory storing instructions for implementing a machine learning (ML) system trained to generate question and answer pairs, wherein the ML system comprises a shared encoder, a question decoder, and an answer decoder; and
   one or more processors in communication with the memory, the one or more processors configured by the instructions to at least:
   identify a seed sentence describing an item represented in an electronic catalog;
   generate a hidden state representation of the seed sentence at least partly by forward passing data representing the seed sentence through the shared encoder;
   generate a question about the item at least partly by forward passing the hidden state representation of the seed sentence through the question decoder;
   extract a hidden state representation of the question from the question decoder;
   combine the hidden state representation of the seed sentence with the hidden state representation of the question;
   generate an answer to the question at least partly by forward passing the combined hidden state representation of the seed sentence with the hidden state representation of the question through the answer decoder; and
   update a user interface depicting information about the item with the question and the answer.

2. The system of claim 1, wherein the shared encoder, the question decoder, and the answer decoder comprise bi-directional long short-term memory neural networks.

3. The system of claim 1, wherein the shared encoder, the question decoder, and the answer decoder are trained by alternately minimizing losses for question and answer outputs.

4. The system of claim 1, wherein the one or more processors are configured by the instructions to at least identify the seed sentence from a customer-generated review of the item.

5. A computer-implemented method comprising:
identifying media describing an item;
providing data representing the media as input into a machine learning (ML) encoder model to generate an embedding of the media;
generating a question about the item at least partly by passing the embedding of the media through a ML question decoder model;
extracting an embedding of the question from the ML question decoder model;
combining the embedding of the media with the embedding of the question to generate an answer decoder model input;
generating an answer to the question at least partly by passing the answer decoder model input through a ML answer decoder model; and
updating a user interface depicting information about the item with at least the question.

6. The computer-implemented method of claim 5, wherein the media comprises text from a customer review of the item, the computer-implemented method further comprising identifying the text from among a plurality of customer reviews of the item based at least partly on similarity between the text and a description of the item.

7. The computer-implemented method of claim 5, further comprising:
identifying a plurality of textual descriptions from among a plurality of customer reviews of the item; and
generating a plurality of question and answer pairs by generating a question and answer pair for each of the plurality of textual descriptions using the ML encoder model, the ML question decoder model, and the ML answer decoder model.

8. The computer-implemented method of claim 7, further comprising:
clustering the plurality of question and answer pairs into a plurality of clusters based on similarity between at least questions of the plurality of question and answer pairs; and
selecting the question and the answer from a largest one of the plurality of clusters.

9. The computer-implemented method of claim 8, further comprising computing the similarity based on subword embeddings of the questions.

10. The computer-implemented method of claim 7, further comprising selecting a set of question and answer pairs from among the plurality of question and answer pairs based on a level of diversity of at least the questions in the set.

11. The computer-implemented method of claim 10, further comprising computing the level of diversity based on subword embeddings of the questions.

12. The computer-implemented method of claim 7, further comprising selecting a set of question and answer pairs from among the plurality of question and answer pairs based on at least two of the question and answer pairs in the set having different answers.

13. A non-transitory computer-readable medium comprising computer-executable instructions that, when executed on a computing system, cause the computing system to perform operations comprising:
identifying media describing an item;
providing data representing the media as input into an encoder model;
generating a question about the item at least partly by passing an output of the encoder model through a question decoder model trained to reflect questions and their corresponding answers;
extracting a representation of the question from the question decoder model;
generating an input that comprises the output of the encoder model and the representation of the question;
generating an answer to the question at least partly by passing the input through an answer decoder model; and
updating a user interface depicting information about the item with at least the question.

14. The non-transitory computer-readable medium of claim 13, the operations further comprising providing a voting mechanism associated with the question in the user interface.

15. The non-transitory computer-readable medium of claim 14, the operations further comprising retraining the encoder model and the question decoder model based on user feedback on the question provided via the voting mechanism.

16. The non-transitory computer-readable medium of claim 13, the operations further comprising:
identifying a plurality of textual descriptions from among a plurality of customer reviews of the item; and
generating a plurality of different questions by passing each of the plurality of textual descriptions through the encoder model and the question decoder model.

17. The non-transitory computer-readable medium of claim 16, the operations further comprising:
clustering the plurality of different questions into a plurality of clusters based on similarity between embedding representations of the different questions; and
selecting the question from a largest one of the plurality of clusters.

18. The non-transitory computer-readable medium of claim 16, the operations further comprising selecting a set of questions from among the plurality of different questions based on a level of diversity of the different questions in the set.

19. The non-transitory computer-readable medium of claim 13, the operations further comprising training the encoder model, the question decoder model, and the answer decoder model, wherein the answer decoder model is configured to generate answers for generated questions by alternately minimizing losses for question and answer outputs.

20. The non-transitory computer-readable medium of claim 19, further comprising identifying a training data triplet including media from a customer review as input and the question and answer outputs based on a computed level of similarity between the media and both of the question and answer outputs.

* * * * *